US010876428B2

(12) United States Patent
Weisbrod et al.

(10) Patent No.: US 10,876,428 B2
(45) Date of Patent: Dec. 29, 2020

(54) CASING OF A TURBOCHARGER AND TURBOCHARGER

(71) Applicant: MAN ENERGY SOLUTIONS SE, Augsburg (DE)

(72) Inventors: Tobias Weisbrod, Augsburg (DE); Santiago Uhlenbrock, Gräfenberg (DE); Steffen Braun, Augsburg (DE); Urban Spatz, Neusäss (DE); Heiko Schmidt, Schmiechen (DE)

(73) Assignee: MAN Energy Solutions SE, Augsburg (DE)

( * ) Notice: Subject to any disclaimer, the term of this patent is extended or adjusted under 35 U.S.C. 154(b) by 214 days.

(21) Appl. No.: 16/249,228

(22) Filed: Jan. 16, 2019

(65) Prior Publication Data
US 2019/0218937 A1    Jul. 18, 2019

(30) Foreign Application Priority Data
Jan. 17, 2018 (DE) .......................... 10 2018 100 937

(51) Int. Cl.
| F01D 25/26 | (2006.01) |
| F01D 25/24 | (2006.01) |
| F02C 6/12  | (2006.01) |
| F01D 21/04 | (2006.01) |

(52) U.S. Cl.
CPC ......... *F01D 25/243* (2013.01); *F01D 21/045* (2013.01); *F01D 25/246* (2013.01); *F02C 6/12* (2013.01); *F01D 25/26* (2013.01); *F05D 2220/40* (2013.01); *F05D 2230/60* (2013.01); *F05D 2240/14* (2013.01); *F05D 2260/941* (2013.01)

(58) Field of Classification Search
CPC .... F01D 25/243; F01D 21/045; F01D 25/145; F01D 25/24; F01D 25/246; F02C 6/12; F05D 2240/14; F05D 2260/941; F05D 2220/40; F05D 2230/60; F05D 2260/31; F04D 29/403; F16B 5/0241
See application file for complete search history.

(56) References Cited

U.S. PATENT DOCUMENTS

| 5,549,449 | A  | * | 8/1996 | McInerney | F01D 25/14 384/413 |
| 6,210,067 | B1 | * | 4/2001 | Postma | F16B 2/241 403/30 |
| 6,612,807 | B2 | * | 9/2003 | Czachor | F01D 9/065 415/116 |
| 8,500,398 | B1 | * | 8/2013 | Walker, Jr. | F01N 13/14 415/177 |

(Continued)

*Primary Examiner* — Eldon T Brockman
(74) *Attorney, Agent, or Firm* — Cozen O'Connor

(57) ABSTRACT

A casing of a turbocharger surrounds a housing to be encased at least in sections, with axial casing segments, which follow the housing to be encased axially outside, and with radial casing segments, which follow the housing to be encased radially outside. In the radial casing segments slot-like material recesses are introduced. Two adjacent slot-like material recesses delimit a strap of a respective radial casing segment. In a region of the respective strap, the radial casing segments are exclusively connected to the housing to be encased. Outside the respective strap, the radial casing segments are exclusively connected to the axial casing segments.

12 Claims, 2 Drawing Sheets

(56) References Cited

U.S. PATENT DOCUMENTS

| | | | |
|---|---|---|---|
| 2019/0072004 A1* | 3/2019 | Braun | F01D 25/08 |
| 2019/0093515 A1* | 3/2019 | Braun | F04D 29/403 |
| 2019/0226361 A1* | 7/2019 | Spatz | F01D 25/26 |
| 2019/0242272 A1* | 8/2019 | Braun | F01D 25/145 |
| 2019/0284956 A1* | 9/2019 | Denkel | F01D 25/26 |

* cited by examiner

CASING OF A TURBOCHARGER AND TURBOCHARGER

BACKGROUND OF THE INVENTION

1. Field of the Invention

The invention relates to a casing of a turbocharger, to a connecting element, and to a turbocharger.

2. Description of the Related Art

The fundamental construction of a turbocharger is known to the person skilled in the art. A turbocharger comprises a turbine, in which a first medium is expanded, a compressor in which a second medium is compressed utilising the energy extracted in the turbine during the expansion of the first medium, a turbine housing, a turbine rotor, a compressor housing, and a compressor rotor. Between the turbine housing and the compressor housing a bearing housing is positioned, wherein the bearing housing on the one hand is connected to the turbine housing and on the other hand to the compressor housing. In the bearing housing, a shaft is mounted via which the turbine rotor is coupled to the compressor rotor.

During the operation of a turbocharger there is the risk that a rotor, for example the turbine rotor or the compressor rotor, of the turbocharger breaks and fragments of the rotor penetrate the relevant housing, i.e. the turbine housing or the compressor housing. This then poses a risk that the fragments of the turbocharger enter the surroundings. In order to take into account this bursting of a rotor of the turbocharger, the housing in turbochargers known from practice is designed in such a manner that a failure of the respective housing is not expected and even during the bursting of the respective rotors, fragments of the same cannot penetrate the respective housing. However, this increases the weight of the turbocharger.

To avoid unnecessarily increase the weight of the turbocharger and moreover to protect turbochargers already employed in the field against fragments of a rotor penetrating into the surroundings, it is already known to equip a turbocharger with a casing, which surrounds a turbine housing and/or a compressor housing and/or a bearing housing of the turbocharger radially outside as well as axially outside at least in sections.

Such casings serve not only for providing a burst protection. Such casings can also serve for thermally insulating assemblies of the turbocharger.

Casings for turbochargers known from practice comprise axial casing elements and radial casing elements. Axial casing elements laterally follow the housing of the turbocharger to be encased axially outside. Radially casing elements follow the housing to be encased radially outside and substantially extend between the axial casing segments.

The casing of a turbocharger is connected by screw connections to a housing of the turbocharger to be encased. During the operation, the turbocharger and thus also the housing of the turbocharger to be encased is exposed to high temperature loads, namely cyclical thermal loads. This can result in a failure of screw connections between the casing and the housing of the turbocharger to be encased. The function of the casing is negatively affected by this.

SUMMARY OF THE INVENTION

One aspect of the invention is a new type of casing of a turbocharger, a connecting element, and a turbocharger with such a casing.

According to one aspect of the invention, slot-like material recesses are introduced into the radial casing segments of the casing, wherein in each case two adjacent slot-like material recesses each delimit a strap of the respective radial casing segment. In the region of the respective strap, the radial casing segments of the casing are exclusively connected to the housing to be encased. Outside the respective strap adjoining the same, the radial casing segments of the casing are exclusively connected to the axial casing segments of the casing.

By way of the straps, which are introduced into the radial casing elements of the casing, cyclical thermal loads, which act on the casing via the housing of the turbine to be encased, can be reduced. It is possible to drastically reduce forces acting on the casing. Because of this, the risk that connections of the casing to the housing of the turbocharger to be encased should fail is reduced. Because of this, the function of the casing can be maintained for longer.

Preferentially, the radial casing segments of the casing comprise a first section extending between the axial casing segments of the casing and a second section extending adjacent to an axial casing segment, wherein the slot-like material recesses extend emanating from the second section into the first section. This allows a particularly advantageous reduction of the cyclical thermal load which, emanating from the housing to be encased, acts on the casing.

Preferentially, first fastening elements, via which the radial casing elements of the casing are connected in the region of the respective strap to the housing to be encased, extend through the second section of the respective radial casing segment. In the projection of the first fastening elements, the respective axial casing segment of the casing has an open material recess radially outside. Second fastening means, via which the radial casing segments of the casing are connected to the respective axial casing segment of the casing outside the respective strap likewise extend through the second section of the respective radial casing segment. By way of this, the cyclical thermal load acting on the casing can be particularly advantageously reduced.

Preferentially, the slot-like material recesses, which delimit the straps, comprise a widened portion in the region of the first section of the respective radial casing segment. The widened portions of such slot-like material recesses, which in each case delimit a strap, face away from one another. By way of the widened portions, notch stresses in the region of the straps can be reduced. By way of this, the cyclical thermal load on the casing acting on the casing can be further reduced and the lifespan of the casing even further increased.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are obtained from the subclaims and the following description.

Exemplary embodiments of the invention are explained in more detail by way of the drawing without being restricted to this. There it shows.

DETAILED DESCRIPTION OF THE PRESENTLY PREFERRED EMBODIMENTS

The invention relates to a casing of a turbocharger and to a turbocharger with a casing.

The fundamental construction of a turbocharger is familiar to the person skilled in the art. Accordingly, a turbocharger comprises a turbine for expending a first medium, in particular for expanding exhaust gas, and a compressor for compressing a second medium, in particular for compressing charge air, namely utilising energy extracted in the turbine during the expansion of the first medium.

The turbine comprises a turbine rotor and a turbine housing. The compressor comprises a compressor rotor and a compressor housing. The turbine rotor and the compressor rotor are coupled via a shaft mounted in a bearing housing of the turbocharger. The bearing housing is connected both to the turbine housing and also to the compressor housing.

During operation if the turbine rotor or the compressor rotor should break, fragments of the same can penetrate the respective housing, i.e. the turbine housing or the compressor housing and enter the surroundings. This has to be avoided for the purpose of which it is known to equip a turbocharger with a casing, which surrounds the turbine housing and/or the compressor housing and/or the bearing housing of the turbocharger.

Preferentially, a separate casing is employed in each case in the region of the turbine housing and of the compressor housing, which surrounds the respective housing of the turbocharger to be encased radially outside and axially outside at least in sections.

Such a casing does not only serve for providing a burst protection for increasing the containment safety, such a casing can also serve for thermally insulating the housing to be encased.

Figure 1:
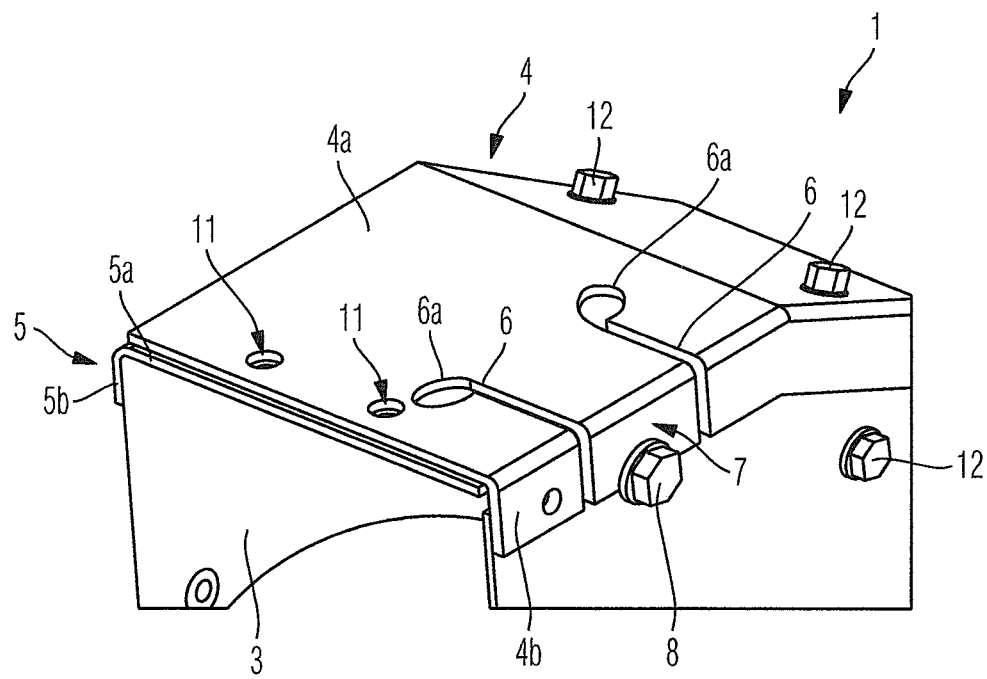
FIG. 1 is a perspective extract from a casing for a turbocharger.
Figure 2:
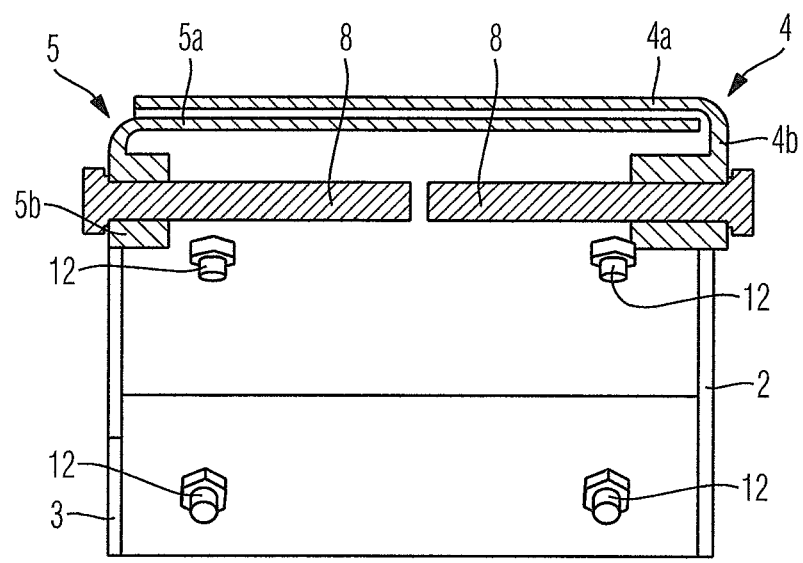
FIG. 2 is a cross section through the extract of FIG. 1.
Figure 3:
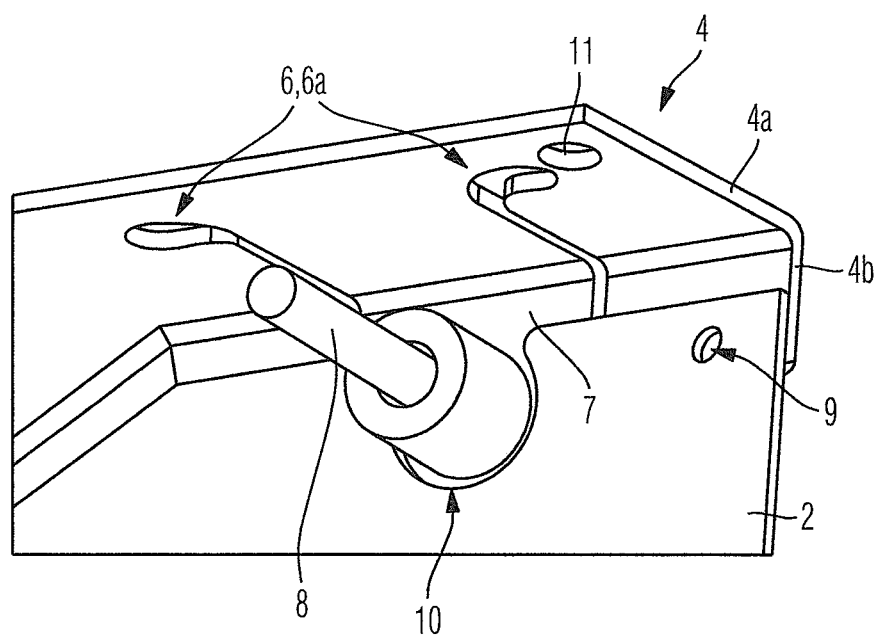
FIG. 3 is a detail of the extract of FIG. 1 in perspective view.

FIGS. 1, 2, and 3 each show views of different extracts of a casing 1 of a turbocharger. The casing 1 shown in FIGS. 1, 2, and 3 is in particular the casing of a turbine inflow housing of the turbocharger. The casing 1 can also be the casing of a compressor housing of the turbocharger.

The casing 1 comprises axial casing segments 2, 3. To each axial side of the housing to be encased, an axial casing element 2, 3 is preferentially positioned in each case, which follows the housing to be encased axially outside and at least partly covers the respective housing to be encased on the corresponding axial side.

In addition to this, the casing 1, furthermore, comprises radial casing segments 4, 5. The radial casing segments 4, 5 follow the respective housing of the turbocharger to be encased radially outside and, seen in the axial direction, extend substantially between the axial casing segments 2, 3.

In the shown preferred exemplary embodiment, the radial casing segments 4, 5 each have a first section 4a, 5a extending between the axial casing segments 2, 3 and a second section 4b, 5b that is angled relative to said first section 4a, 5a, extending adjacent to one of the axial casing segments 2, 3.

The second section 4b of the radial casing segment 4 extends substantially parallel to the axial casing segment 2. The second section 5b of the radial casing segment 5 extends substantially parallel to the axial casing segment 3.

The first sections 4a, 5a of the two radial casing segments 4, 5 extend radially spaced substantially parallel to one another, wherein in the shown exemplary embodiment the first section 4a of the radial casing segment 4 runs radially outside from the first section 5a of the radial casing segment 5. Between the first sections 4a, 5a of the two radial casing segments 4, 5, spacers are preferentially arranged.

Slot-like material recesses 6 are introduced into the radial casing segments 4, 5. The slot-like material recesses 6 in the shown exemplary embodiment extend emanating from the respective second section 4b, 5b of the respective radial casing segment 4, 5 into the first section 4a, 5a of the respective radial casing element 4, 5, wherein in each case two adjacent slot-like material recesses 6 delimit in each case a strap 7 of the respective radial casing segment 4, 5.

In the region of a respective strap 7, the radial casing segments 4, 5 are exclusively connected to the housing to be encased, namely via first fastening element 8, which extends through the second section 4b, 5b of the respective radial casing segment 4, 5 in the region of the respective strap 7.

Outside the respective strap 7 adjoining the same, the radial casing segments 4, 5 are exclusively connected to the respective adjacent axial casing segment 2, 3, namely via second fastening elements.

The second fastening elements likewise extend through the second sections 4b, 5b of the respective radial casing segments 4, 5, namely into the respective axial casing segment 2, 3, namely outside the respective strap 7.

FIGS. 1 and 3 show recesses 9 for these second fastening elements, via which the radial casing segments 4, 5 outside the region of the straps 7 are each connected to a respective axial casing segment 2, 3.

As is evident from FIG. 3, the respective axial casing segment 2, 3 in the axial projection of the first fastening elements 8 have a material recess 10 that is open radially outside. Because of this, the respective strap 7 of the respective radial casing segment 3, 4 can move independently of the adjoining respective axial casing segment 2, 3.

As is evident from FIGS. 1 and 3, the slot-like material recesses 6, which delimit the straps 7, have a curved or round widened portion 6a of the material recess 6 in the region of the first section 4a, 5a of the respective radial casing segment 4, 5, namely at the end of the respective slot-like material recess 6, so that the slot-like material recesses 6 have a golf club-like contouring. Here, the widened portions 6a of such slot-like material recesses 6, which in each case jointly delimit a strap 7, preferentially face away from one another.

By way of the straps 7 of the radial casing segments 4, 5, which can also be referred to as thermo-straps, it is possible to reduce forces which, because of a cyclical thermal loading of the housing to be encased, can be introduced into the casing 1.

Because of this, screw connections of the casing 1 are exposed to a lower loading, as a result of which the risk that the casing 1 should fail can be reduced.

By way of the widened portions 6a of the material recesses 6, the notch stress in the straps 7 can be reduced, as a result of which the lifespan can still be further increased.

The first sections 4a, 5a of the radial casing segments 4, 5 can be connected outside the strips 7, via further fastening elements 12, which extend through recesses 11 in the first sections 4a, 5a of the radial casing segments 4, 5.

The invention is preferentially employed with casings serving for providing a burst protection or containment protection. However, the invention is not restricted to this application case. It can also be employed with casings serving for thermal insulation.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A casing of a turbocharger, which at least in sections surrounds a housing to be encased, comprising:
    axial casing segments that axially follow an outside the housing to be encased;
    radial casing segments that radially follow the outside the housing to be encased; and
    a strap of a respective radial casing segment delimited by two adjacent slot-like material recesses introduced into the radial casing segments,
    wherein the radial casing segments in a region of the respective strap are exclusively connected to the housing to be encased, and
    wherein the radial casing segments outside the respective strap are exclusively connected to the axial casing segments.

2. The casing according to claim 1, wherein each radial casing segment comprise:
    a first section extending between the axial casing segments; and
    a second section extending adjacent to a respective axial casing segment,
    wherein the slot-like material recesses, emanating from the second section, extend into the first section of the respective radial casing segment.

3. The casing according to claim 2, wherein first fasteners extend through the second section of the respective radial casing segment and connect the radial casing segments to the housing to be encased in the region of the respective strap.

4. The casing according to claim 2, wherein second fasteners extend through the second section of the respective radial casing segment and connect the radial casing segments outside the respective strap to the respective axial casing segment.

5. The casing according to claim 3, wherein the respective axial casing segment in a projection of the first fasteners comprises a material recess that is open radially outside.

6. The casing according to claim 2, wherein the slot-like material recesses have a widened portion in a region of the first section of the respective radial casing segment.

7. The casing according to claim 6, wherein the widened portion is formed at an end of the slot-like material recess in the region of the first section of the respective radial casing segment.

8. The casing according to claim 6, wherein the widened portions of such slot-like material recesses, which each delimit a strap, face away from one another.

9. The casing according to claim 7, wherein the widened portions of such slot-like material recesses, which each delimit a strap, face away from one another.

10. The casing according to claim 1, wherein the housing to be encased is at least one of a turbine housing, a compressor housing, and a bearing housing of the turbocharger.

11. A connecting element for a casing having:
    slot-like material recesses are defined in the connecting element;
    wherein two adjacent slot-like material recesses delimit a strap,
    wherein the connecting element in a region of a respective strap is exclusively connected to a housing to be encased.

12. A turbocharger, comprising:
    a turbine for expanding a first medium;
    a compressor for compressing a second medium utilising energy extracted in the turbine during expansion of the first medium;
    a turbine housing of the turbine;
    a compressor housing of the compressor
    a bearing housing arranged between and connected to the turbine housing and the compressor housing; and
    a casing surrounding a housing to be encased, which is at least one of the turbine housing, the compressor housing, and the bearing housing, comprising:
        axial casing segments that axially follow an outside the housing to be encased;
        radial casing segments that radially follow the outside the housing to be encased; and
        a strap of a respective radial casing segment delimited by two adjacent slot-like material recesses introduced into the radial casing segments,
        wherein the radial casing segments in a region of the respective strap are exclusively connected to the housing to be encased, and
    wherein the radial casing segments outside the respective strap are exclusively connected to the axial casing segments.

* * * * *